(12) United States Patent
Keyes et al.

(10) Patent No.: US 11,781,836 B2
(45) Date of Patent: Oct. 10, 2023

(54) SYSTEMS AND METHODS FOR MODEL BASED INERTIAL NAVIGATION FOR A SPINNING PROJECTILE

(71) Applicant: Honeywell International Inc., Charlotte, NC (US)

(72) Inventors: Sally Ann Keyes, Minneapolis, MN (US); Calvin Samborski, Saint Louis Park, MN (US); Dean Richard Wilkens, Scottsdale, AZ (US); Dale F. Enns, Roseville, MN (US)

(73) Assignee: Honeywell International Inc., Charlotte, NC (US)

( * ) Notice: Subject to any disclaimer, the term of this patent is extended or adjusted under 35 U.S.C. 154(b) by 181 days.

(21) Appl. No.: 17/192,535

(22) Filed: Mar. 4, 2021

(65) Prior Publication Data
US 2022/0282955 A1    Sep. 8, 2022

(51) Int. Cl.
*F41G 7/36*    (2006.01)
*F41G 7/00*    (2006.01)
(Continued)

(52) U.S. Cl.
CPC .............. *F41G 7/36* (2013.01); *F41G 7/007* (2013.01); *F41G 7/222* (2013.01); *F41G 7/2213* (2013.01);
(Continued)

(58) Field of Classification Search
CPC .......... F41G 7/36; F41G 7/007; F41G 7/2213; F41G 7/222; F41G 7/346; F42B 5/01; G05D 1/108
See application file for complete search history.

(56) References Cited

U.S. PATENT DOCUMENTS 5,075,861 A    12/1991    Hasson et al.
6,163,021 A *  12/2000    Mickelson .............. F41G 7/305
                                                              244/164
(Continued)

FOREIGN PATENT DOCUMENTS

CN    106679657 B    10/2019
CN    111708377 A    9/2020
(Continued)

OTHER PUBLICATIONS

European Patent Office, "Extended European Search Report from EP Application No. 221565004.7", from Foreign Counterpart to U.S. Appl. No. 17/192,535, dated Aug. 3, 2022, pp. 1 through 9, Published: EP.
(Continued)

*Primary Examiner* — Marcus E Windrich
(74) *Attorney, Agent, or Firm* — Fogg & Powers LLC

(57) ABSTRACT

Model based inertial navigation for a spinning projectile is provided. In one embodiment, a navigation system comprises: a strapdown navigation processor; a propagator-estimator filter, the processor inputs inertial sensor data and navigation corrections from the filter to generate a navigation solution comprising projectile velocity and attitude estimates; an upfinding navigation aid that generates an angular attitude measurement indicative of a roll angle; and a physics model performing calculations utilizing dynamics equations for a rigid body, the model inputs 1) projectile state estimates from the navigation solution and 2) platform inputs indicative of forces acting on a projectile platform, and outputs a set of three orthogonal predicted translational acceleration measurements based on the inputs; the filter comprises a measurement equation associated with the physics model and the upfinding navigation aid and calculates the navigation corrections as a function of the navigation solu-
(Continued)

tion, the predicted translational acceleration measurements, and attitude measurement.

18 Claims, 3 Drawing Sheets

(51) Int. Cl.
*F41G 7/22* (2006.01)
*F41G 7/34* (2006.01)
*F42B 15/01* (2006.01)
*G05D 1/10* (2006.01)

(52) U.S. Cl.
CPC .............. *F41G 7/346* (2013.01); *F42B 15/01* (2013.01); *G05D 1/108* (2013.01)

(56) References Cited

U.S. PATENT DOCUMENTS

| | | | |
|---|---|---|---|
| 6,208,936 | B1 | 3/2001 | Minor et al. |
| 7,395,987 | B2 | 7/2008 | Lindquist et al. |
| 7,409,290 | B2 | 8/2008 | Lin |
| 8,219,267 | B2 | 7/2012 | Hamke et al. |
| 8,416,130 | B2 | 4/2013 | Scherzinger |
| 8,457,882 | B2* | 6/2013 | Pyne .................. G01C 21/20 701/418 |
| 9,428,279 | B2 | 8/2016 | Ganguli et al. |
| 9,435,661 | B2 | 9/2016 | Brenner et al. |
| 9,702,674 | B2 | 7/2017 | Fairfax et al. |
| 9,978,285 | B2 | 5/2018 | Khaghani et al. |
| 10,417,469 | B2 | 9/2019 | Davidson et al. |
| 10,648,814 | B2 | 5/2020 | Hardt et al. |
| 10,989,539 | B1 | 4/2021 | Frey, Jr. et al. |
| 2002/0008661 | A1 | 1/2002 | McCall et al. |
| 2008/0269963 | A1 | 10/2008 | Vos et al. |
| 2010/0121601 | A1* | 5/2010 | Eckert .................. G01C 25/005 701/500 |
| 2016/0349026 | A1* | 12/2016 | Fairfax .................. G01C 21/08 |
| 2017/0016728 | A1 | 1/2017 | Sheard et al. |
| 2017/0160306 | A1* | 6/2017 | Sheard .................. G05D 1/108 |
| 2017/0322030 | A1 | 11/2017 | Sheard et al. |
| 2017/0363428 | A1 | 12/2017 | Faulkner et al. |
| 2018/0112983 | A1 | 4/2018 | Ahmed et al. |
| 2018/0340779 | A1* | 11/2018 | Faulkner .................. F42B 15/01 |
| 2020/0064136 | A1 | 2/2020 | Henderson |
| 2021/0197918 | A1 | 7/2021 | Goto et al. |

FOREIGN PATENT DOCUMENTS

| | | |
|---|---|---|
| JP | 5569681 B2 | 8/2014 |
| KR | 101846019 B1 | 4/2018 |

OTHER PUBLICATIONS

Bryson et al., "Vehicle Model Aided Inertial Navigation for a UAV using Low-cost Sensors", Jan. 2004, pp. 1 through 10.
Keyes, Sally A., "Systems and Methods for Model Based Vehicle Navigation", U.S. Appl. No. 17/144,826, filed Jan. 8, 2021, pp. 1 through 22, Published: US.
Khaghani et al., "Autonomous and Non-Autonomous Dynamic Model Based Navigation System for Unmanned Vehicles", Navigation-Journal of the Institute of Navigation, 2016, pp. 345 through 358, vol. 63, Issue 3, Abstract pp. 1 through 3.
Koifman et al., "Inertial Navigation System Aided by Aircraft Dynamics", IEEE Transactions on Control Systems Technology, Jul. 1999, pp. 487 through 493, vol. 7, No. 4, IEEE.
Lie, "Synthetic air data system", Journal of Aircraft, Jul.-Aug. 2013, pp. 1234-1249, vol. 50, No. 4.
Zahran et al., "Hybrid Machine Learning VDM for UAVs in GNSS-denied Environment", Journal of the Institute of Navigation, 2018, pp. 477 through 492, vol. 65, No. 3, Navigation.
Cork, Lennon, "Aircraft Dynamic Navigation for Unmanned Aerial Vehicles", PhD dissertation, May 29, 2014, pp. i through 203, Brisbane, AU, Retrieved from the internet: http:\\eprints.qut.edu.au/71396/1/Lennon_Cork_Thesis.pdf, retrieved on Nov. 16, 2016.
European Patent Office, "Extended European Search Report from EP Application No. 21217658.0", from Foreign Counterpart to U.S. Appl. No. 17/144,826, dated Jun. 23, 2022, pp. 1 through 8, Published: EP.
U.S. Patent and Trademark Office, "Office Action", U.S. Appl. No. 17/1447,826, dated Dec. 8, 2022, pp. 1 through 29, Published: US.
U.S. Patent and Trademark Office, "Notice of Allowance", U.S. Appl. No. 17/144,826, filed Mar. 22, 2023, pp. 1 through 9, Published: US.
Fairfax et al., "Position Estimation for Projectiles Using Low-cost Sensors and Flight Dynamics", ARL-TR-5994, Apr. 2012, Army Research Laboratory, Aberdeen Proving Ground, MD, Page(s) Cover through 32.
Hegrenaes, et al., "Model-Aided Intertial Navigation for Underwater Vehicles", In proceedings of the IEEE International Conference on Robotics and Automation, Pasadena, California, USA, 2008, pp. 1 through 8.

* cited by examiner

SYSTEMS AND METHODS FOR MODEL BASED INERTIAL NAVIGATION FOR A SPINNING PROJECTILE

BACKGROUND

Spinning projectile navigation systems typically comprise a trajectory model generator that establishes the trajectory that is to be followed by the spinning projectile upon launch. For example, a prediction model is typically executed to determine position and which direction is up (with respect to the Earth) just after launch, then when the spinning projectile reaches its peak altitude, a satellite based position update obtained to address any accumulated errors in position. While some spinning projectile navigation systems have attempted to integrate measurements from inertial measurement units (IMUs) to help track position and to keep the projectile on its correct trajectory, there are several challenges that are introduced using IMU for navigation in spinning projectiles.

Because spinning projectiles can have rotation rates on the order of several thousand rotations per minutes, even for a IMU gyroscope that has a small scale factor error, those errors for gyroscopes measuring angular rotation on the projectiles spinning axis will grow quickly and without bound. Further, unlike other non-spinning airborne craft such as airplanes, gyroscope measurements for spinning projectiles can suffer from a windup affect. That is, as an aircraft such as an airplane travels along its trajectory, it will bank left, and bank right, so that to some extent the aircraft's own motion causes inertial errors in aircraft roll to cancel themselves out. But a spinning projectile is always spinning in the same direction so that the error in angular measurements on the spinning axis continues to accumulate.

The consequences of unbounded angular rate measurement errors are severalfold. First, the inertial sensors of an IMU are measuring angular rates and specific force with respect to the body frame of the projectile. Navigation, however, is performed with respect to the Earth's navigation frame. An accurate projectile attitude measurement is needed to accurately map body frame referenced measurements to the Earth's navigation frame. Moreover, in modern navigation systems, navigation filters iteratively integrate data from gyroscope and acceleration measurements to produce navigation solutions comprising one or more of projectile position, velocity, acceleration and attitude. The inertial measurements are fed back into the navigation filter's processing algorithms such that if there is a large and unbounded gyro scale factor error in the spin direction, that will be manifested as an error in each parameter of the navigation solution.

For the reasons stated above and for other reasons stated below which will become apparent to those skilled in the art upon reading and understanding the specification, there is a need in the art for systems and methods for model based inertial navigation for a spinning projectile.

SUMMARY

The Embodiments of the present disclosure provide methods and systems for model based inertial navigation for a spinning projectile and will be understood by reading and studying the following specification.

In one embodiment, a navigation system for a spinning projectile comprises: a strapdown navigation processor; a propagator-estimator filter, wherein the strapdown navigation processor is configured to input inertial sensor data and to input navigation corrections from the propagator-estimator filter to generate a navigation solution, the navigation solution comprising at least a projectile velocity estimate and a projectile attitude estimate; an upfinding navigation aid configured to generate an angular attitude measurement indicative of a roll angle of the spinning projectile with respect to the Earth; and a spinning projectile physics model configured to perform calculations utilizing dynamics equations for a rigid body, wherein the spinning projectile physics model inputs 1) one or more projectile state estimates from the navigation solution and 2) one or more platform inputs indicative of forces acting on a projectile platform, and the spinning projectile physics model outputs at least a set of three orthogonal predicted translational acceleration measurements based on the inputs; wherein the propagator-estimator filter comprises a measurement equation associated with the physics model and the upfinding navigation aid and is configured to calculate the navigation corrections as a function of the navigation solution, the set of predicted translational acceleration measurements, and angular attitude measurement indicative of a roll angle.

DRAWINGS

Embodiments of the present disclosure can be more easily understood and further advantages and uses thereof more readily apparent, when considered in view of the description of the preferred embodiments and the following figures in which.

In accordance with common practice, the various described features are not drawn to scale but are drawn to emphasize features relevant to the present disclosure. Reference characters denote like elements throughout figures and text.

DETAILED DESCRIPTION

In the following detailed description, reference is made to the accompanying drawings that form a part hereof, and in which is shown by way of specific illustrative embodiments in which the embodiments may be practiced. These embodiments are described in sufficient detail to enable those skilled in the art to practice the embodiments, and it is to be understood that other embodiments may be utilized and that logical, mechanical and electrical changes may be made without departing from the scope of the present disclosure. The following detailed description is, therefore, not to be taken in a limiting sense.

Embodiments of the present disclosure address the need for inertial navigation for spinning projectiles by providing model based projectile navigation systems and methods. Measurements from two distinct aiding sources are utilized together to compute navigation corrections to a strapdown navigation processor that bounds the errors in the velocity and attitude components of the navigation solution computed by the strapdown navigation processor. That is, even given the continuous spinning of the projectile and the scale factor error of the inertial sensor measuring that spin, the error in the navigation solution from the strapdown navigation processor is bound at least with respect to velocity and attitude. As discussed in greater detail below, the first aiding source is a spinning projectile physics model that is an aerodynamics and propulsion model that utilizes dynamics equations for a rigid body. In this context, the spinning projectile physics model represents the underlying physics that drive the equations of motion corresponding to projectile dynamics. The spinning projectile physics model provides a relationship between platform input measurements indicative of forces acting on the projectile body, projectile states and the resulting linear and angular accelerations. The second aiding source is an upfinding navigation aid configured to generate an angular measurement indicative of an upward direction that relates the roll angle of body frame of the projectile to the Earth. The measurements from this navigation aid are used in conjunction with the measurements from the spinning projectile physics model to further limit the attitude error that is integrated into navigation position and velocity errors, thus bounding velocity errors and position errors in the navigation solution fed to the projectile guidance system. This ultimately results in a projectile that more accurately follows its desired trajectory.

Figure 1:
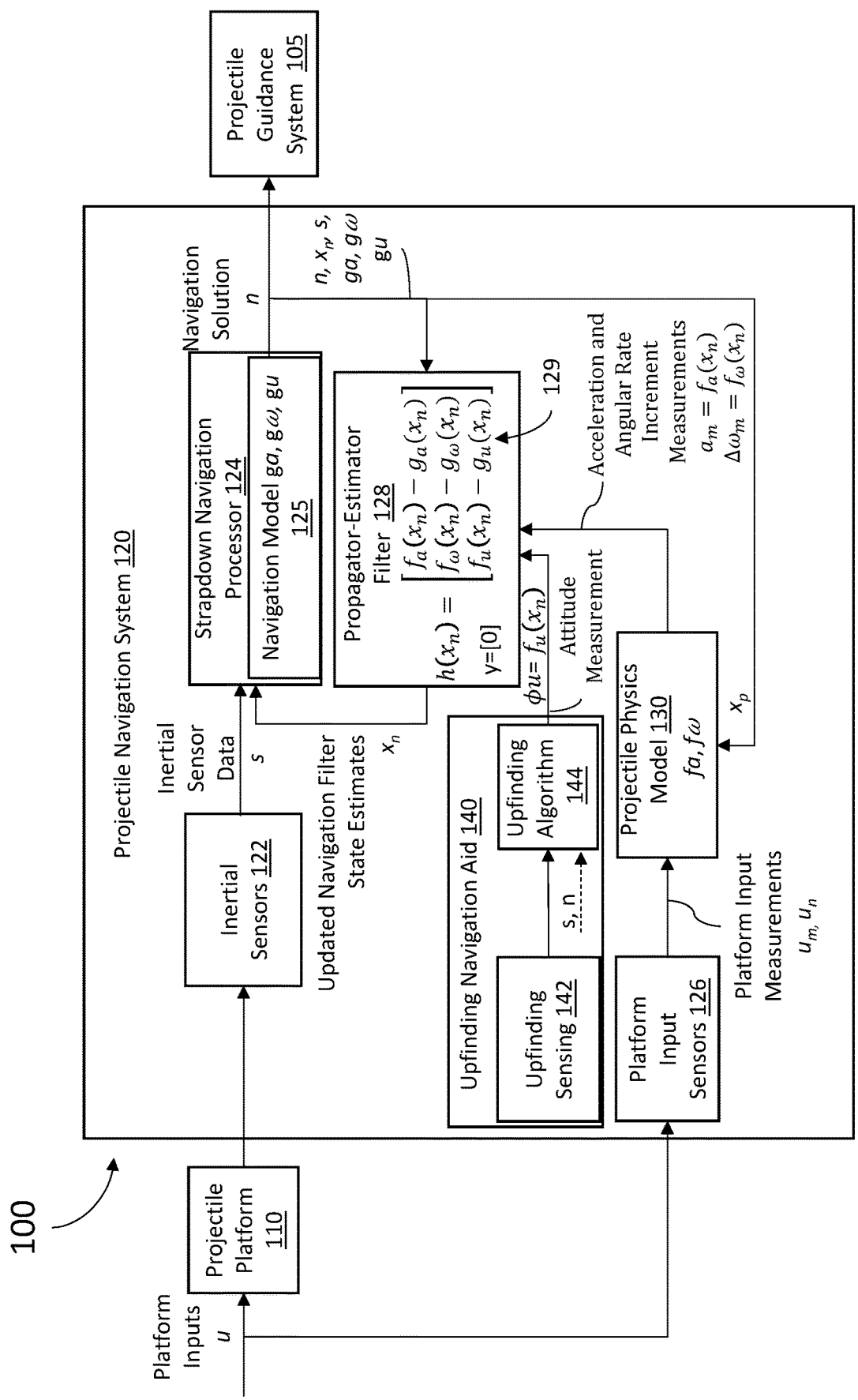
FIG. 1 is a block diagram of a guided spinning projectile comprising a guided projectile navigation system 120 of one embodiment of the present disclosure.

FIG. 1 is a block diagram of a guided spinning projectile 100 comprising a guided projectile navigation system 120 of one embodiment of the present disclosure. In FIG. 1, the projectile platform 110 represents the structural elements of the guided spinning projectile 100 (for example, like the fuselage, fins and control surfaces), with the platform inputs, u, and the projectile states, $x_p$, representing the variables that result in the forces and moments acting on the projectile platform 110 which may influence the linear and rotational accelerations of the guided spinning projectile 100. As such, the platform inputs, u, include jet or rocket engine propulsion or related parameters such as throttle setting or engine RPM that result in platform generated propulsion forces generated either directly or indirectly from the projectiles engines. For example, platform generated propulsion forces may include thrusts produced by jet or rocket engines (determined in part by the throttle). Additional platform inputs, u, include control surface deflection (such as aileron, elevator, or rudder deflection) that results in aerodynamic forces acting on the spinning projectile 100. The platform inputs, u, also include external variables such as wind velocity, which affects the aerodynamic forces acting on the guided spinning projectile 100.

The projectile states, $x_p$, (which include velocity and attitude) are used in the dynamics equations in the spinning projectile physics model 130 and are derived from the navigation solution, n, navigation filter states, $x_n$, and inertial sensor data, s. Along with the wind velocity, the projectile states, $x_p$, can be used to determine the speed of the relative wind, the angle of attack, the sideslip angle, and the bank angle. These parameters result in aerodynamic forces and moments (such as lift and drag forces) that influence the linear and rotational accelerations of the projectile 100. The inertial sensors 122 function to sense and measure the net accelerations (both linear and rotation) of the structural elements of the guided spinning projectile 100 caused by the platform inputs, u, and projectile states, $x_p$. For example, the inertial sensors 122 may comprise sets of accelerometers and gyroscopes. In some embodiments, the inertial sensors 122 may be implemented using low-grade inertial sensors (i.e., non-navigation grade sensors such as tactical and industrial grade sensors) such a micro-electromechanical system (MEMS) accelerometers and MEMS gyroscopes or other industrial or tactical grade inertial sensors.

The output from the inertial sensors 122 is raw inertial sensor data, s, which in some embodiments includes three orthogonal specific force measurements resulting from linear acceleration forces applied to the projectile platform 110, and three orthogonal angular rate measurements resulting from rotational moments applied to the projectile platform 110. In some embodiments, the inertial sensors 122 may be implemented as an inertial measurement unit (IMU) comprising sets of gyroscopes and accelerometers that produce the three orthogonal specific force measurements and three orthogonal angular rate measurements.

The strapdown navigation processor 124 inputs the inertial sensor data, s, to produce a navigation solution, n, which includes at least projectile attitude and velocity estimates. When the inertial sensors 122 are less-than navigation grade, the navigation solution, n, if left uncorrected would accumulate errors in the projectile attitude and velocity estimates that are unbounded. Moreover, in the context of the constantly spinning projectile 100, the error in angular measurements for the spinning axis from the inertial sensor data will increase unbounded having a direct negative consequence on the accuracy of the navigation solution position and velocity estimates.

However, with embodiments of the present disclosure, navigation corrections (which may be in the form of updated navigation filter state estimates) are provided to the strapdown navigation processor 124 so that potential projectile attitude and velocity errors are bounded. The strapdown navigation processor 124 adjusts the raw inertial sensor data, s, produced by the inertial sensors 122 as a function of the updated navigation filter state estimates resulting in a navigation solution, n, that is more accurate than what could be derived from the raw inertial sensor data, s, alone. Moreover, the potential error in the velocity and/or attitude components of the navigation solution with respect to the true velocity and attitude projectile states is bounded so that the projectile guidance system 105 may operate to control and navigate the guided spinning projectile 100 target based on a navigation solution input that is accurate to within known tolerances.

In some embodiments of the present disclosure, two distinct aiding sources are utilized for navigation corrections, in the form of updated navigation filter state estimates, that are provided to the strapdown navigation processor 124. These aiding sources are acceleration measurements from a projectile physics mode and attitude measurements from an upfinding navigation aid.

As shown in FIG. 1, the guided projectile navigation system 120 further comprises platform input sensors 126, the spinning projectile physics model 130 which performs calculations utilizing dynamics equations for a rigid body corresponding to the projectile platform 110, an upfinding navigation aid 140, and a propagator-estimator filter 128. It should be understood that the guided projectile navigation system 120 may comprise one or more processors and memory programmed with code that when executed implement the functions of any of the spinning projectile physics model 130, upfinding navigation aid 140, propagator-estimator filter 128 or strapdown navigation processor 124.

Predicted acceleration forces corresponding to what the inertial sensors 122 should be sensing can be estimated based on a physics model of the projectile platform 110 implemented by a spinning projectile physics model 130. With one or more of the embodiments presented in this disclosure, the spinning projectile physics model 130 computes sets of linear accelerations and optionally angular rate increments (given by the functions $f_a$ and $f_\omega$) as a function of navigation filter states, $x_n$, of the propagator-estimator filter 128, and those linear accelerations and angular rate increments ($f_a$ and $f_\omega$) are fed into the propagator-estimator filter 128 as an aiding source.

In the embodiments shown in FIG. 1, the platform input sensors 126 output to the spinning projectile physics model 130, indications of platform inputs that may be obtained from measured input ($u_m$), platform inputs that are estimated as a navigation filter state ($u_n$), or both. For example, engine thrust may be a measured input but wind velocity may be an estimated input that is one of the navigation filter states. The spinning projectile physics model 130 applies the measured and/or estimated platform inputs to calculate linear acceleration measurements, $a_m$, that comprise a set of three orthogonal predicted translational acceleration measurements which are provided as aiding source inputs to the propagator-estimator filter 128. In some embodiments, the linear acceleration measurement, $a_m$, may be expressed as:

$$a_m = f_a(x_p, u) = f_a(f(n, x_n, s), [u_m, u_n])$$

where $a_m$ is the linear acceleration given by the spinning projectile physics model 130 and is defined by the function $f_a$, which depends on platform states, $x_p$, and platform inputs, u. It should be understood that the linear acceleration measurement, $a_m$, may take the form of a vector that includes three measurement values, one for each of the projectile platform's three orthogonal linear axes (i.e., x-axis, y-axis and z-axis) defining the set of three orthogonal predicted translational acceleration measurements. This function fa is characterized by the forces acting on the platform and the mass of the platform. The rigid body platform equations of motion include equations for the linear acceleration. The dependence on platform states can be replaced with a dependence on navigation filter states as shown in the expression above. The platform states, $x_p$, may be expressed as:

$$x_p = f(n, x_n, s)$$

The platform states, $x_p$, include at least the projectile velocity states and may include additional projectile states for attitude, angular rate, and position for a model derived from rigid body equations of motion. The platform states $x_p$, may be computed from the navigation solution, n, the navigation filter states, $x_n$, and the inertial sensor data, s. The navigation filter states, $x_n$, utilized by the spinning projectile physics model 130 correspond to navigation filter states, $x_n$, computed by the propagator-estimator filter 128. The navigation filter states, $x_n$, may include navigation and sensor errors and also may be augmented with platform inputs $u_n$ and/or other auxiliary states (e.g., $x_n \supset u_n$). In some embodiments, the navigation filter states, $x_n$, may be obtained or derived by the spinning projectile physics model 130 from the output of the strapdown navigation processor 124.

In some embodiments, the spinning projectile physics model 130 optionally may further compute an acceleration measurement that includes three orthogonal angular rate increment measurements, $\Delta\omega_m$, which may be expressed as a function $f_\omega$ by the expression:

$$\Delta\omega_m = f_\omega(x_p, u, \Delta t) = f_\omega(f(n, x_n, s), [u_m, u_n], \Delta t)$$

which depends on platform states, $x_p$, platform inputs, u. and a specified time step, $\Delta t$. This function is characterized by the moments acting on the platform and moment of inertia or inertia tensor of the platform. It should be understood that the angular rate increment measurement, $\Delta\omega_m$, may take the form of a vector that includes three measurement values, one value for moments around each of the projectile platform's three orthogonal linear axes (i.e., rotation around the x-axis, rotation around the y-axis and rotation around the z-axis). The rigid body platform equations of motion include equations for computing angular acceleration, which can be integrated to provide equations for angular rate increments. In some embodiments, dependence on platform states can be replaced with a dependence on navigation filter states as shown in the expression.

The process of estimating the roll angle in a spinning projectile is referred to as "Upfinding" and in FIG. 1, this function is performed by the upfinding navigation aid 140. As shown in FIG. 1, the upfinding navigation aid 140 comprises an upfinding sensing function 142 coupled to an upfinding algorithm 144. The upfinding navigation aid 140 functions as a second navigation aid for producing navigation corrections with the upfinding algorithm 144 computing an attitude measurement based on parameters sensed or estimated by the upfinding sensing function 142. Accelerations caused by the Earth's gravity are always in the direction of the center of the Earth so that when an accurate estimate of the projectile's attitude is derived, a vector relating that acceleration to the body frame of the projectile can be determined. This gravitational acceleration vector can be summed with the vectors for measured accelerations sensed by the inertial sensors 122, integrated once to obtain projectile velocity and integrated again to obtain position. The embodiments presented herein estimate projectile velocities and the attitude using the combination of the output from the projectile physics model 130 and the upfinding navigation aid 140 to constrain uncertainty and provide continuous navigation corrections to the strapdown navigation processor 124 to produce a navigation solution that is bounded with respect to attitude error in addition to velocity.

The upfinding navigation aid 140 may be implemented in different ways. For example, components on the spinning projectile 100 may produce outputs having components that inherently vary as a function of the projectile's rate of spin. That is, the spinning of the projectile may cause a modulation to a signal that can be detected, analyzed, and utilized. On-board inertial sensors are an example of one such component. In some embodiments, the upfinding sensing function 142 may comprise or otherwise be coupled to such components and is configured to sense and measure at least one parameter that corresponds to the spin axis angular rotation rate. The angular rate measurements can then be processed by an upfinding algorithm 144 (such as through an integration process) to produce a roll angle estimate that is used by the propagator-estimator filter 128. Non-limiting examples of upfinding systems that may be used to implement the upfinding navigation aid 140 include U.S. Pat. No. 6,163,021 titled "NAVIGATION SYSTEM FOR SPINNING PROJECTILES", and U.S. Pat. No. 7,395,987 "APPARATUS AND APPERTAINING METHOD FOR UPFINDING IN SPINNING PROJECTILES USING A PHASE-LOCK-LOOP OR CORRELATOR MECHANISM" which are each incorporated by reference herein in their entirety. In some embodiments, upfinding algorithm 144 may optionally use a blended or hybrid approach for producing the roll angle estimate. For example, the upfinding algorithm 144 may further input the attitude estimates from the navigation solution, n, and/or angular rotation rate information from the inertial sensor data, s, and compute a weighted average between those inputs and the measurements from the upfinding sensing function 142 to compute the roll angle included in the attitude measurement to the propagator-estimator filter 128.

In some embodiments, the propagator-estimator filter 128 may comprise a Kalman filter, or variant thereof (such as an extended Kalman filter (EKF) or unscented Kalman filter (UKF), for example) or other propagator-estimator filter such as Particle filter (for example, a Sequential Monte Carlo (SMC) filter).

A propagator-estimator filter algorithm, in the context of a projectile navigation system, is a filter algorithm that acts to filter and blend data from navigation sensors and navigation aids having varying degrees of accuracy, in order to establish an optimal estimate of a projectile's navigation states. The filter algorithm implements a recursive filter which estimates one or more state variables of a dynamic system from a series of incomplete, noisy, or relatively imprecise measurements. That is, the propagator-estimator filter 128 predicts what the values of a future set of projectile states should be based on their present values, while considering any errors that can be normally expected in that data due to noise or equipment tolerances. Propagator-estimator filter 128 produces error state estimates based on that prediction and compares those states to the next set of measurement data it receives. Any differences between the measured data and the predictions based on the updated error states represent a deviation referred to as a residual error. If the residual is small, the propagator-estimator filter 128 will attempt to correct for the error by applying the residual error (or at least some fraction of it) into its next iteration of predicted values of the navigation filter states.

In some embodiments, the propagator-estimator filter 128 may comprise a Kalman filter, or variant thereof (such as an extended Kalman filter (EKF) or unscented Kalman filter (UKF), for example) or other propagator-estimator filter such as Particle filter (for example, a Sequential Monte Carlo (SMC) filter).

With embodiments of the present disclosure, the propagator-estimator filter 128 comprises a measurement equation (such as shown at 129) associated with both the spinning projectile physics model 130 and upfinding navigation aid 140 so that when the propagator-estimator filter 128 outputs navigation corrections to the strapdown navigation processor 124, those navigation corrections will bound velocity and attitude errors in the navigation solution. In other words, the propagator-estimator filter 128 calculates the navigation corrections as a function of the navigation solution, further utilizing the set of predicted translational acceleration measurements from the spinning projectile physics model 130 and attitude measurements from upfinding navigation aid 140 as navigation aids. The measurement equation may be represented by the variable y as shown by:

$$y = h(x_n, n, s, u_m, \Delta t) = h(x_n)$$

which is a function of the navigation filter states, $x_n$, as described by the function h which computes the differences between the spinning projectile physics model 130 derived linear and angular accelerations and the inertial sensor 122 derived linear and angular accelerations, and the differences between the upfinding navigation aid 140 derived attitude measurements and the inertial sensor 122 derived attitude measurements. If all other variables in the measurement equation are considered fixed, h can be written as a function of only $x_n$. The difference between the spinning projectile physics model 130 derived accelerations and the inertial sensor 122 derived accelerations associated with each of the projectile's respective linear acceleration and rotational acceleration axes should ideally be zero if the navigation filter states, $x_n$, within the propagator-estimator filter 128 are correct. Similarly, the difference between the upfinding navigation aid 140 derived attitude measurements and the inertial sensor 122 derived attitude measurements should ideally be zero if the navigation filter states, $x_n$, within the propagator-estimator filter 128 are correct. Consequently, the value of the measurement equation, y, is set to zero. When the function h does not produce a y=0, the propagator-estimator filter 128 derives error residuals that form the basis for navigation corrections fed to the strapdown navigation processor 124 after each filter iteration to produce a navigation solution that drives the value of the measurement equation, y, in propagator-estimator filter 128 towards zero.

In some embodiments, further improvements in bounding errors in the navigation solution by incorporating into the strapdown navigation processor 124 a navigation model 125. The navigation model 125 comprises algorithms to compute linear accelerations and angular accelerations from the inertial sensor data, s. For example, in some embodiments the inertial sensors 122 may comprise a less-than navigation grade sensor unit (such as a MEMS sensor) that includes a set of three accelerometers and three gyroscopes. For example, in some embodiments, the inertial sensor data comprises one or more specific force measurements from a MEMS accelerometer for estimating linear acceleration. In such embodiments, the navigation model 125 can calculate from the inertial sensor data, s, a respective set of three orthogonal linear acceleration values and three orthogonal angular acceleration values. In some embodiments, to better facilitate application of the navigation corrections from the propagator-estimator, the navigation model 125 executes algorithms that incorporate the navigation filter states, $x_n$, when calculating the navigation solution, n. More specifically, the navigation corrections received by the strapdown navigation processor 124 as computed by the propagator-estimator filter 128 comprise updated navigation filter state estimates. For example, a linear acceleration, an, computed by the navigation model 125 may be expressed as:

$$a_n = g_a(n, x_n, s)$$

where $a_n$ is defined by the function $g_a$, which depends on the navigation solution, n, the updated navigation filter state, $x_n$, estimates provided by the propagator-estimator filter 128, and the inertial sensor data, s from the inertial sensors 122. It should be understood that the linear acceleration measurement, $a_n$, may take the form of a vector that includes up to three measurement values, one for each of the projectile platform's three orthogonal linear axes (i.e., x-axis, y-axis and z-axis). This function, $g_a$, is characterized by the measured specific force, accelerometer error estimates, and the effect of attitude coupling with gravity.

Similarly, in some embodiments an angular rate increment, $\Delta\omega_n$, computed by the navigation model 125 may be expressed as:

$$\Delta\omega_n = g_\omega(n, x_n, s, \Delta t)$$

where $\Delta\omega_n$ is the change in angular rate given by the navigation model and is defined by the function $g_\omega$, which depends on the navigation solution, n, the updated navigation filter state, $x_n$, estimates provided by the propagator-estimator filter 128, the inertial sensor data, s from the inertial sensors 122, and a specified time step $\Delta t$. It should be understood that the angular acceleration measurement, $\Delta\omega_n$, may take the form of a vector that includes three measurement values, one value for moments around each of the projectile platform's three orthogonal linear axes (i.e., rotation around the x-axis, rotation around the y-axis and rotation around the z-axis). This function $g_\omega$ is characterized by the measured angular rate and gyroscope error estimates.

The navigation model 125 may compute angular rate from the inertial sensor data, s, which can be differenced at specified times to compute the change in angular rate.

In some embodiments an attitude measurement, $\phi_n$, computed by the navigation model 125 may be expressed as:

$$\phi_n = g_u(n, x_n)$$

where $\phi_n$ is defined by the function $g_u$, which depends on the navigation solution, n, and the updated navigation filter state, $x_n$, estimates provided by the propagator-estimator filter 128. This function, $g_u$, is characterized by the integration of angular rate into attitude, which is affected by inertial sensor errors and navigation errors.

Feeding back the resulting $g_a$, $g_\omega$, and $g_u$ values into the propagator-estimator filter 128, the measurement equations, y, may be more particularly expressed as:

$$y = h(x_n) = \begin{bmatrix} a_m - a_n \\ \Delta\omega_m - \Delta\omega_n \\ \phi u - \phi n \end{bmatrix} = \begin{bmatrix} f_a(x_n) - g_a(x_n) \\ f_\omega(x_n) - g_\omega(x_n) \\ f_u(x_n) - g_u(x_n) \end{bmatrix} = [0]$$

where $\phi_u$ is the attitude measurement (e.g., projectile roll angle relative to the vertical) computed by the upfinding algorithm 144 and $\phi_n$ is that same quantity computed by the strapdown navigation processor 124. This measurement equation is formed by differencing the spinning projectile physics model 130 and navigation model 125 computations for linear accelerations and changes in angular rate, and differencing the upfinding algorithm 144 and navigation model 125 computations for attitude. As explained above, the measurement equation is computed under the condition that y=[0] because the difference for each should be zero if the navigation filter state estimates, $x_n$, are correct.

Figure 2:
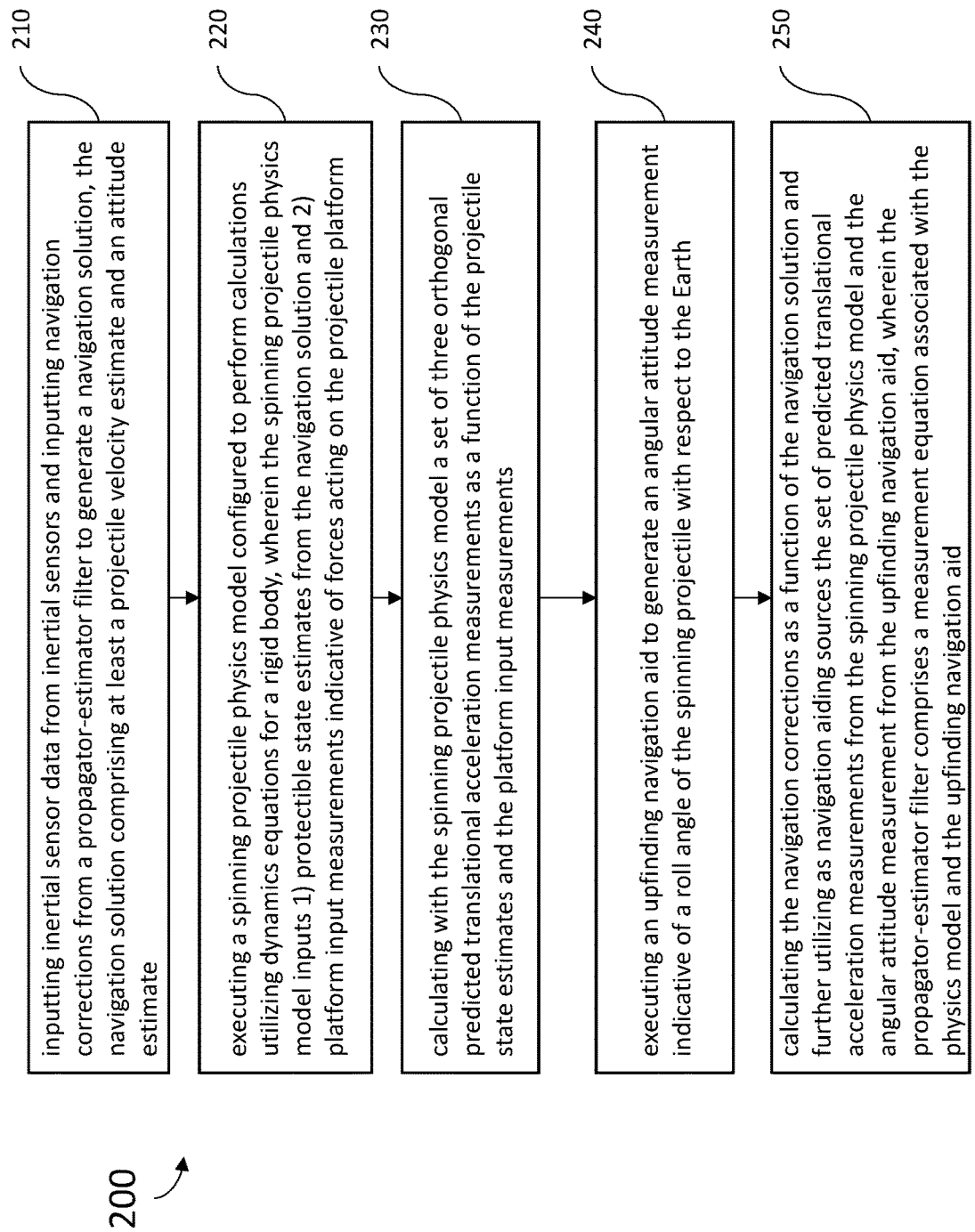
FIG. 2 is a flow chart illustrating at 200 an example method embodiment for model based inertial navigation for a spinning projectile.

FIG. 2 is a flow chart illustrating at 200 an example method embodiment for model based inertial navigation for a spinning projectile. It should be understood that the features and elements described herein with respect to the method 200 of FIG. 2 may be used in conjunction with, in combination with, or substituted for elements of any of the other embodiments discussed herein with respect to FIG. 1 or other figures, and vice versa. Further, it should be understood that the functions, structures and other description of elements for embodiments described herein may apply to like or similarly named or described elements across any of the figures and/or embodiments describe therewith.

The method begins at 210 with inputting inertial sensor data from inertial sensors and inputting navigation corrections from a propagator-estimator filter to generate a navigation solution, the navigation solution comprising at least a projectile velocity estimate and an attitude estimate. In some embodiments, the navigation solution attitude estimate comprises at least a projectile roll angle (e.g., an angular position with respect to the axis on which the projectile is spinning) of the projectile body frame.

At 220, the method includes executing a spinning projectile physics model configured to perform calculations utilizing dynamics equations for a rigid body, wherein the spinning projectile physics model inputs 1) protectible state estimates from the navigation solution and 2) platform input measurements indicative of forces acting on the projectile platform. As discussed above, the platform input measurements may include sensor data or derived input estimates that are indicative of forces acting on the projectile platform. The projectile state estimates may correspond to navigation state estimates computed by the propagator-estimator filter.

At 230, the method includes calculating with the spinning projectile physics model a set of three orthogonal predicted translational acceleration measurements as a function of the projectile state estimates and the platform input measurements. In some embodiments, the method further includes calculating with the spinning projectile physics model three angular rate measurements, for moments around each of the projectile platform's three orthogonal linear axes.

At 240, the method proceeds with executing an upfinding navigation aid to generate an angular attitude measurement indicative of a roll angle of the spinning projectile with respect to the Earth. As discussed above, accelerations caused by the Earth's gravity are always in the direction of the center of the Earth with "up" being the opposite direction away from the center of the Earth. The roll angle measurement from the upfinding navigation aid this corresponds to a vector relating the Earth gravitational acceleration to the body frame of the projectile.

At 250, the method includes calculating the navigation corrections as a function of the navigation solution and further utilizing as navigation aiding sources the set of predicted translational acceleration measurements from the spinning projectile physics model and the angular attitude measurement from the upfinding navigation aid, wherein the propagator-estimator filter comprises a measurement equation associated with the physics model and the upfinding navigation aid.

By incorporating into the propagator-estimator filter a measurement equation that comprises navigation states corresponding with those utilized by the spinning projectile physics model, the propagator-estimator filter calculates navigation corrections to the strapdown navigation processor that will bound velocity and attitude errors in the navigation solution.

Figure 3:
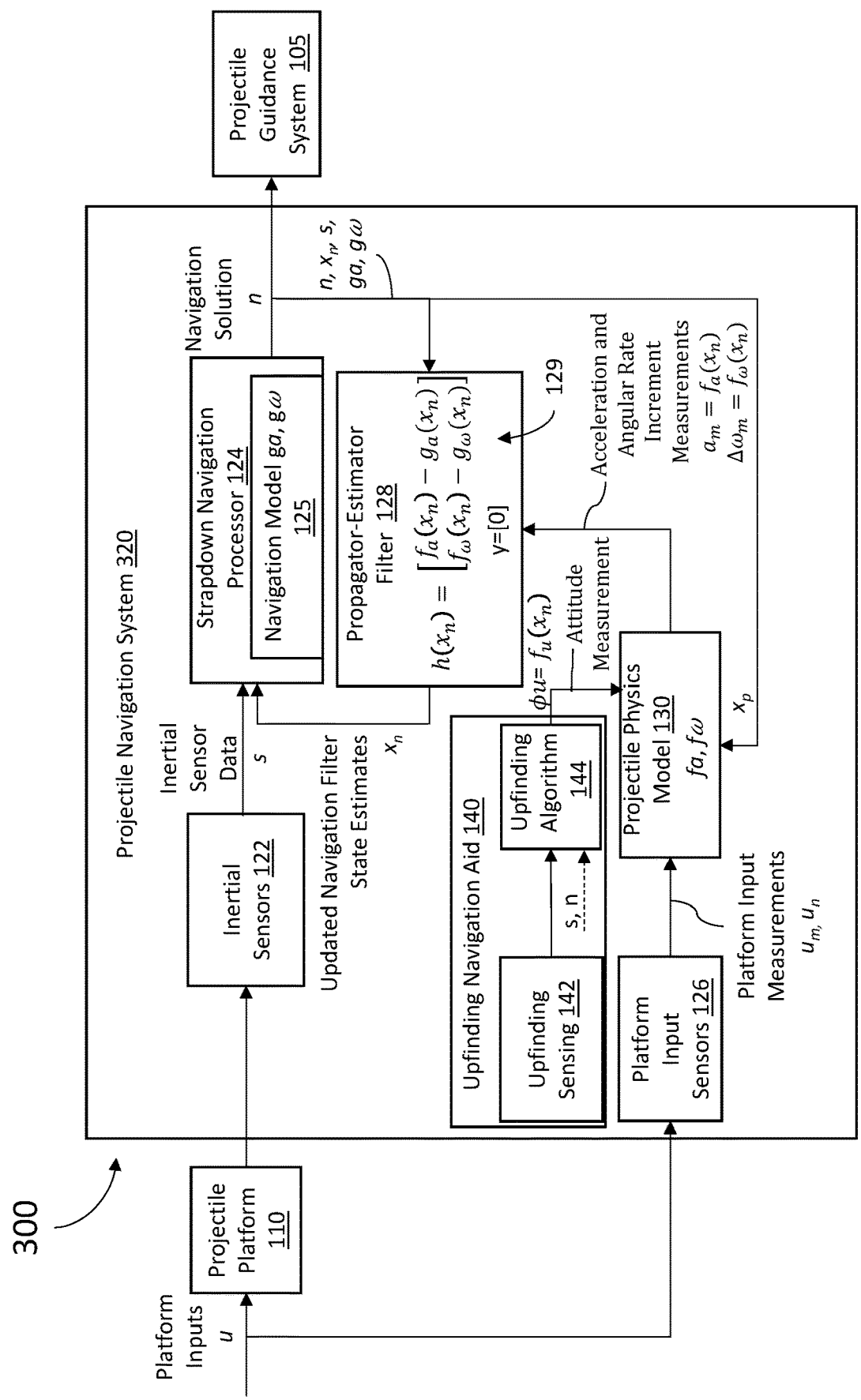
FIG. 3 is a block diagram showing an alternative guided projectile navigation system embodiment.

FIG. 3 is a block diagram showing at 300 an alternative guided projectile navigation system 320 of one embodiment of the present disclosure for projectile 100. It should be understood that the features and elements described herein with respect to the guided projectile navigation system 320 of FIG. 1 apply to the guided projectile navigation system 320 of FIG. 3 except as otherwise noted. Further, it should be understood that the functions, structures and other description of elements for embodiments described herein may apply to like or similarly named or described elements across any of the figures and/or embodiments describe therewith.

As shown in FIG. 3, in the alternative guided projectile navigation system 320, the attitude measurement produced by the upfinding navigation aid 140 is utilized to enhance the accuracy of the spinning projectile physics model 130 rather than functioning as a direct aiding source to the propagator-estimator filter 128. Because the spinning projectile physics model 130 has some sensitivity to attitude uncertainties, then providing the spinning projectile physics model 130 with the attitude measurement from the upfinding navigation aid 140 will increase the accuracy of its acceleration and angular rate increment measurement outputs to the propagator-estimator filter 128. As discussed above, in some embodiments the output from the upfinding navigation aid 140 may be a weighted or blended solution using the navigation solution, n, data and/or the inertial sensor data, s. In that case, the propagator-estimator filter 128 the measurement equations, y, may be more particularly expressed as:

$$y = h(x_n) = \begin{bmatrix} a_m - a_n \\ \Delta\omega_m - \Delta\omega_n \end{bmatrix} = \begin{bmatrix} f_a(x_n) - g_a(x_n) \\ f_\omega(x_n) - g_\omega(x_n) \end{bmatrix} = [0]$$

where the $f_a(x_n)$ and $f_\omega(x_n)$ inputs to the propagator-estimator filter 128 benefit from less uncertainty due to the incorporation of attitude measurements from the upfinding navigation aid 140 to the spinning projectile physics model 130.

EXAMPLE EMBODIMENTS

Example 1 includes a navigation system for a spinning projectile, the system comprising: a strapdown navigation processor; a propagator-estimator filter, wherein the strapdown navigation processor is configured to input inertial sensor data and to input navigation corrections from the propagator-estimator filter to generate a navigation solution, the navigation solution comprising at least a projectile velocity estimate and a projectile attitude estimate; an upfinding navigation aid configured to generate an angular attitude measurement indicative of a roll angle of the spinning projectile with respect to the Earth; and a spinning projectile physics model configured to perform calculations utilizing dynamics equations for a rigid body, wherein the spinning projectile physics model inputs 1) one or more projectile state estimates from the navigation solution and 2) one or more platform inputs indicative of forces acting on a projectile platform, and the spinning projectile physics model outputs at least a set of three orthogonal predicted translational acceleration measurements based on the inputs; wherein the propagator-estimator filter comprises a measurement equation associated with the physics model and the upfinding navigation aid and is configured to calculate the navigation corrections as a function of the navigation solution, the set of predicted translational acceleration measurements, and angular attitude measurement indicative of a roll angle.

Example 2 includes the system of example 1, further comprising one or more platform input sensors, wherein at least one of the one or more platform inputs are generated by the one or more platform input sensors.

Example 3 includes the system of any of examples 1-2, wherein the inertial sensor data comprises one or more specific force measurement from one or more angular rate measurements from one or more inertial sensors.

Example 4 includes the system of any of examples 1-3, wherein the propagator-estimator filter comprises a Kalman Filter, an Extended Kalman Filter, an Unscented Kalman Filter, or a Particle Filter.

Example 5 includes the system of any of examples 1-4, wherein the measurement equation is computed by the propagator-estimator filter as a function of differences between spinning projectile physics model derived accelerations and inertial sensor derived accelerations, differences between upfinding navigation aid derived attitude measurements and strapdown navigation system derived attitude measurements, and navigation filter states of the propagator-estimator filter.

Example 6 includes the system of any of examples 1-5, wherein the spinning projectile physics model is configured to calculate dynamics equations for a rigid body corresponding to the projectile platform.

Example 7 includes the system of any of examples 1-6, wherein the spinning projectile physics model computes the set of predicted translational acceleration measurements as a function of navigation filter states of the propagator-estimator filter.

Example 8 includes the system of any of examples 1-7, wherein the spinning projectile physics model computes predicted translational acceleration measurements caused by forces acting on the spinning projectile.

Example 9 includes the system of any of examples 1, wherein the upfinding navigation aid comprises an upfinding algorithm configured to compute an attitude measurement based on parameters sensed or estimated by an upfinding sensing function.

Example 10 includes the system of example 9, wherein the upfinding sensing function determines a rate of spin by analyzing a signal having a component that varies as a function of a rate of spin of the spinning projectile.

Example 11 includes the system of any of examples 9-10, where the upfinding algorithm processes an angular rate measurement from the upfinding sensing function to produce the roll angle estimate provided to the propagator-estimator filter.

Example 12 includes the system of any of examples 1-11, wherein the strapdown navigation processor comprises a navigation model configured to compute linear accelerations and angular rate increments from the inertial sensor data and updated navigation filter state estimates from the propagator-estimator filter.

Example 13 includes a method embodiment for model based inertial navigation for a spinning projectile, the method comprising: inputting inertial sensor data from inertial sensors and inputting navigation corrections from a propagator-estimator filter to generate a navigation solution, the navigation solution comprising at least a projectile velocity estimate and an attitude estimate; executing a spinning projectile physics model configured to perform calculations utilizing dynamics equations for a rigid body, wherein the spinning projectile physics model inputs 1) one or more projectile state estimates from the navigation solution and 2) one or more platform input measurements indicative of forces acting on the projectile platform; calculating with the spinning projectile physics model a set of three orthogonal predicted translational acceleration measurements as a function of the one or more projectile state estimates and the platform input measurements; executing an upfinding navigation aid to generate an angular attitude measurement indicative of a roll angle of the spinning projectile with respect to the Earth; and calculating the navigation corrections as a function of the navigation solution and further utilizing as navigation aiding sources the set of predicted translational acceleration measurements from the spinning projectile physics model and the angular attitude measurement from the upfinding navigation aid, wherein the propagator-estimator filter comprises a measurement equation associated with the physics model and the upfinding navigation aid.

Example 14 includes the method of example 13, wherein the inertial sensor data comprises one or more specific force measurement from one or more angular rate measurements from one or more inertial sensors.

Example 15 includes the method of any of examples 13-14, wherein the measurement equation is computed by the propagator-estimator filter as a function of differences between spinning projectile physics model derived accelerations and inertial sensor derived accelerations, differences between upfinding navigation aid derived attitude measurements and strapdown navigation system derived attitude measurements, and navigation filter states of the propagator-estimator filter.

Example 16 includes the method of any of examples 13-15, wherein the spinning projectile physics model is configured to calculate dynamics equations for a rigid body corresponding to the projectile platform.

Example 17 includes the method of any of examples 13-16, wherein the upfinding navigation aid comprises an upfinding algorithm configured to compute an attitude measurement based on parameters sensed or estimated by an upfinding sensing function.

Example 18 includes the method of example 17, wherein the upfinding sensing function determines a rate of spin by analyzing a signal having a component that varies as a function of a rate of spin of the spinning projectile.

Example 19 includes the method of any of examples 17-18, where the upfinding algorithm processes an angular rate measurement from the upfinding sensing function to produce the roll angle estimate provided to the propagator-estimator filter.

Example 20 includes the method of any of examples 13-19, wherein the navigation solution is computed by a strapdown navigation processor that comprises a navigation model configured to compute linear accelerations and angular rate increments from the inertial sensor data and updated navigation filter state estimates from the propagator-estimator filter.

In various alternative embodiments, system and/or device elements, method steps, or example implementations described throughout this disclosure (such as any of the platform input sensors, inertial sensors, spinning projectile physics model, upfinding navigation aid, upfinding sensing function, upfinding algorithm, propagator-estimator filter, strapdown navigation processor, navigation model, projectile guidance system, or any controllers, processors, circuits, or sub-parts thereof, for example) may be implemented at least in part using one or more computer systems, field programmable gate arrays (FPGAs), or similar devices comprising a processor coupled to a memory and executing code to realize those elements, processes, or examples, said code stored on a non-transient hardware data storage device. Therefore, other embodiments of the present disclosure may include elements comprising program instructions resident on computer readable media which when implemented by such computer systems, enable them to implement the embodiments described herein. As used herein, the term "computer readable media" refers to tangible memory storage devices having non-transient physical forms. Such non-transient physical forms may include computer memory devices, such as but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device having a physical, tangible form. Program instructions include, but are not limited to computer-executable instructions executed by computer system processors and hardware description languages such as Very High Speed Integrated Circuit (VHSIC) Hardware Description Language (VHDL).

As used herein, terms such as "platform input sensors", "inertial sensors", "spinning projectile physics model", "propagator-estimator filter", "strapdown navigation processor", "navigation model", "projectile guidance system", "upfinding navigation aid" refer to the names of elements that would be understood by those of skill in the art of avionics industries and are not used herein as nonce words or nonce terms for the purpose of invoking 35 USC 112(f).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the presented embodiments. Therefore, it is manifestly intended that embodiments be limited only by the claims and the equivalents thereof.

What is claimed is:

1. A navigation system for a spinning projectile, the system comprising:
   a strapdown navigation processor;
   a propagator-estimator filter, wherein the strapdown navigation processor is configured to input inertial sensor data and to input navigation corrections from the propagator-estimator filter to generate a navigation solution, the navigation solution comprising at least a projectile velocity estimate and a projectile attitude estimate;
   an upfinding navigation aid configured to generate an angular attitude measurement indicative of a roll angle of the spinning projectile with respect to the Earth; and
   a spinning projectile physics model configured to perform calculations utilizing dynamics equations for a rigid body, wherein the spinning projectile physics model inputs 1) one or more projectile state estimates from the navigation solution and 2) one or more platform inputs indicative of forces acting on a projectile platform, and the spinning projectile physics model outputs at least a set of three orthogonal predicted translational acceleration measurements based on the inputs;
   wherein the propagator-estimator filter comprises a measurement equation associated with the physics model and the upfinding navigation aid and is configured to calculate the navigation corrections as a function of the navigation solution, the set of predicted translational acceleration measurements, and angular attitude measurement indicative of a roll angle, wherein the measurement equation is computed by the propagator-estimator filter as a function of differences between spinning projectile physics model derived accelerations and inertial sensor derived accelerations, differences between upfinding navigation aid derived attitude measurements and strapdown navigation system derived attitude measurements, and navigation filter states of the propagator-estimator filter.

2. The system of claim 1, further comprising one or more platform input sensors, wherein at least one of the one or more platform inputs are generated by the one or more platform input sensors.

3. The system of claim 1, wherein the inertial sensor data comprises one or more specific force measurement from one or more angular rate measurements from one or more inertial sensors.

4. The system of claim 1, wherein the propagator-estimator filter comprises a Kalman Filter, an Extended Kalman Filter, an Unscented Kalman Filter, or a Particle Filter.

5. The system of claim 1, wherein the spinning projectile physics model is configured to calculate dynamics equations for a rigid body corresponding to the projectile platform.

6. The system of claim 1, wherein the spinning projectile physics model computes the set of predicted translational acceleration measurements as a function of navigation filter states of the propagator-estimator filter.

7. The system of claim 1, wherein the spinning projectile physics model computes predicted translational acceleration measurements caused by forces acting on the spinning projectile.

8. The system of claim 1, wherein the upfinding navigation aid comprises an upfinding algorithm configured to compute an attitude measurement based on parameters sensed or estimated by an upfinding sensing function.

9. The system of claim 8, wherein the upfinding sensing function determines a rate of spin by analyzing a signal having a component that varies as a function of a rate of spin of the spinning projectile.

10. The system of claim 8, where the upfinding algorithm processes an angular rate measurement from the upfinding sensing function to produce the roll angle estimate provided to the propagator-estimator filter.

11. The system of claim 1, wherein the strapdown navigation processor comprises a navigation model configured to compute linear accelerations and angular rate increments from the inertial sensor data and updated navigation filter state estimates from the propagator-estimator filter.

12. A method embodiment for model based inertial navigation for a spinning projectile, the method comprising:
inputting inertial sensor data from inertial sensors and inputting navigation corrections from a propagator-estimator filter to generate a navigation solution, the navigation solution comprising at least a projectile velocity estimate and an attitude estimate;
executing a spinning projectile physics model configured to perform calculations utilizing dynamics equations for a rigid body, wherein the spinning projectile physics model inputs 1) one or more projectile state estimates from the navigation solution and 2) one or more platform input measurements indicative of forces acting on the projectile platform;
calculating with the spinning projectile physics model a set of three orthogonal predicted translational acceleration measurements as a function of the one or more projectile state estimates and the platform input measurements;
executing an upfinding navigation aid to generate an angular attitude measurement indicative of a roll angle of the spinning projectile with respect to the Earth; and
calculating the navigation corrections as a function of the navigation solution and further utilizing as navigation aiding sources the set of predicted translational acceleration measurements from the spinning projectile physics model and the angular attitude measurement from the upfinding navigation aid, wherein the propagator-estimator filter comprises a measurement equation associated with the physics model and the upfinding navigation aid, wherein the measurement equation is computed by the propagator-estimator filter as a function of differences between spinning projectile physics model derived accelerations and inertial sensor derived accelerations, differences between upfinding navigation aid derived attitude measurements and strapdown navigation system derived attitude measurements, and navigation filter states of the propagator-estimator filter.

13. The method of claim 12, wherein the inertial sensor data comprises one or more specific force measurement from one or more angular rate measurements from one or more inertial sensors.

14. The method of claim 12, wherein the spinning projectile physics model is configured to calculate dynamics equations for a rigid body corresponding to the projectile platform.

15. The method of claim 12, wherein the upfinding navigation aid comprises an upfinding algorithm configured to compute an attitude measurement based on parameters sensed or estimated by an upfinding sensing function.

16. The method of claim 15, wherein the upfinding sensing function determines a rate of spin by analyzing a signal having a component that varies as a function of a rate of spin of the spinning projectile.

17. The method of claim 15, where the upfinding algorithm processes an angular rate measurement from the upfinding sensing function to produce the roll angle estimate provided to the propagator-estimator filter.

18. The method of claim 12, wherein the navigation solution is computed by a strapdown navigation processor that comprises a navigation model configured to compute linear accelerations and angular rate increments from the inertial sensor data and updated navigation filter state estimates from the propagator-estimator filter.

* * * * *